US007965171B2

(12) United States Patent
Hershkovitz

(10) Patent No.: US 7,965,171 B2
(45) Date of Patent: Jun. 21, 2011

(54) SECURITY SYSTEM ENTRY CONTROL

(76) Inventor: Shmuel Hershkovitz, Freeport (BS)

( * ) Notice: Subject to any disclaimer, the term of this patent is extended or adjusted under 35 U.S.C. 154(b) by 1007 days.

(21) Appl. No.: 11/381,675

(22) Filed: May 4, 2006

(65) Prior Publication Data

US 2007/0257790 A1 Nov. 8, 2007

(51) Int. Cl.
*G06K 19/00* (2006.01)

(52) U.S. Cl. .......................................... 340/5.2; 340/5.8

(58) Field of Classification Search ................... 340/5.2, 340/528, 527, 5.8, 5.21, 825.36, 10.41, 297, 340/384.71, 393.4

See application file for complete search history.

(56) References Cited

U.S. PATENT DOCUMENTS

| | | | | |
|---|---|---|---|---|
| 4,189,719 | A | 2/1980 | Massa et al. | |
| 4,271,405 | A | 6/1981 | Kitterman | |
| 4,689,610 | A * | 8/1987 | Dietrich | 340/515 |
| 4,737,770 | A | 4/1988 | Brunius et al. | |
| 4,951,029 | A | 8/1990 | Severson | |
| 5,225,806 | A | 7/1993 | Stanley-Arslanok et al. | |
| 5,309,144 | A | 5/1994 | Lacombe et al. | |
| 5,325,084 | A | 6/1994 | Timm et al. | |
| 5,461,372 | A | 10/1995 | Busak et al. | |
| 5,831,533 | A | 11/1998 | Kanno | |
| 6,069,655 | A | 5/2000 | Seeley et al. | |
| 6,111,502 | A | 8/2000 | Lenglart et al. | |
| 6,225,903 | B1 | 5/2001 | Soloway et al. | |
| 6,462,652 | B1 | 10/2002 | McCuen et al. | |
| 6,622,912 | B2 | 9/2003 | Tejedor Ruiz | |
| 6,812,836 | B2 * | 11/2004 | Soloway et al. | 340/542 |
| 6,912,429 | B1 | 6/2005 | Bilger | |
| 7,250,853 | B2 * | 7/2007 | Flynn | 340/506 |
| 7,298,253 | B2 * | 11/2007 | Petricoin et al. | 340/523 |
| 7,403,109 | B2 * | 7/2008 | Martin | 340/516 |
| 2003/0128099 | A1 | 7/2003 | Cockerham | |
| 2005/0160325 | A1 | 7/2005 | Ogino et al. | |
| 2005/0249382 | A1 * | 11/2005 | Schwab et al. | 382/115 |
| 2006/0090079 | A1 | 4/2006 | Oh et al. | |
| 2006/0181408 | A1 * | 8/2006 | Martin | 340/528 |

FOREIGN PATENT DOCUMENTS

| | | | |
|---|---|---|---|
| CA | 2 503 352 | A1 | 5/2004 |
| EP | 1 400 939 | A1 | 3/2004 |
| EP | 1 643 470 | A2 | 4/2006 |
| WO | 9713230 | | 4/1997 |
| WO | WO 02/23498 | A1 | 3/2002 |

OTHER PUBLICATIONS

ADEMCO Security System User's Manual 4110DL/4110XM, Sep. 1996, http://www.adt.com/wps/wcm/resources/file/ebf9e40b4ae65cb/manual_ademco_4110.pdf.*

Francs, Matthew, Alarm system keypads, http://www.theallineed.com/home/05060403.htm, pp. 1-4.

(Continued)

*Primary Examiner* — Daniel Wu
*Assistant Examiner* — Rufus Point
(74) *Attorney, Agent, or Firm* — Sterne, Kessler, Goldstein & Fox, P.L.L.C.

(57) ABSTRACT

A security system is operable in a stay mode in which protected premises perimeter sensors or detectors are armed wherein a delay is provided between detection of breach of the perimeter and generating an alarm. The security system is able to authenticate a user during the delay and to restore the stay mode without generating the alarm and without disarming the protected premises perimeter sensors or detectors.

19 Claims, 6 Drawing Sheets

OTHER PUBLICATIONS

Honeywell: "Galaxy 16 and 16 plus user's guide" Internet Citation (2003), XP002440981, Retrieved from the Internet: URL:http://www.pr-alarms.co.uk/images/galaxy16userguide.pdf, [retrieved on Jul. 3, 2007].

Safewatch Pro 3000EN Entrepreneur 3000EN Security Manager 3000EN Security Systems User's Guide, Model SASW3000EN, ADT Security Services, 2000, Retrieved from the Internet: www.adt.ca/_pdf/manuals09/en/swp3000en_en.pdf.

Supplementary European Search Report and the European Search Opinion issued in the European Patent Application No. 07719653.3, European Patent Office, Munich, Germany, mailed on Apr. 8, 2010 (search completed on Mar. 26, 2010).

Office Action mailed on Oct. 18, 2010, issued in CA Application No. 2,648,482 to inventor Shmuel Hershkovitz, with a filing date of Apr. 27. 2007.

European Office Action directed to related European Application No. 07 719 653.3-1232, mailed Mar. 15, 2011, from the European Patent Office, Rijswijk, Netherlands; 5 pages.

* cited by examiner

SECURITY SYSTEM ENTRY CONTROL

FIELD OF THE INVENTION

The present invention relates to intrusion security systems and more particularly to arming and disarming control of such security systems.

BACKGROUND OF THE INVENTION

A conventional security system integrates a number of sensors or detectors for detecting an intrusion within protected premises, such as a home or place of business, with a control system for interpreting the sensor or detectors signals for the purposes of generating an alarm. The control system for small security systems typically has a single control panel and a single keypad. The control panel is connected by wire or wirelessly to all sensors or detectors, and has control over alarm generation whether by local siren or by telecommunications, such as telephone network or cable network. The control panel is also connected to the keypad that serves as the user interface within the protected premises for arming and disarming the security system, and for programming or configuring the security system.

Most security systems today allow for the user to enter a code at the keypad to arm the security system, and either the same or a different code to disarm the security system. The keypad is safely located within the protected premises, and for those detectors that would detect an entry or exit, there is a timer used to delay the action of alarm generation from the time that a sensor or a detector generates an intrusion signal. This timer may be set to about 15 to 60 seconds, and allows for entry and exit by a user.

In many systems, the keypad can also be used for programming or setting features, such as which sensors or detectors, identified as zones within the protected premises, are to be activated or deactivated. This is done commonly by using the keypad, and in many systems, the user enters a special security code at the keypad to enter a programming or setting mode.

Another common feature that can be programmed or set using the keypad is the stay mode. Stay mode is an armed mode where the premises is protected from intruding while staying at the premises. At this mode of operation, the detection of sensors and detectors within the protected premises is ignored, such as passive infrared motion detectors, Doppler shift microwave intrusion detectors, inside passage door sensors and floor load cell sensors. Only sensors and detectors that essentially monitor entry or egress remain activated. The stay mode is configured typically by entering the programming mode and selecting zones to be deactivated in the stay mode. The stay mode is turned on and off (namely to be in the away mode) by entering a security code and selecting the stay or away mode. The stay mode protects the perimeter of the premises and is very important in areas where there is a threat of intrusion while an occupant remains within the premises.

Such conventional security systems are vulnerable to intruders who are able to monitor the premises from outside and enter the premises at the moment when an occupant leaves or enters and other occupants remain within the premises with the security system armed in the stay mode. The timer used to allow exit or entry causes one or more zones of the security system to be by-passed during the timed period, and this may allow not only the occupant to leave or enter without generating an alarm but also the intruder. Once within the premises, the stay mode will allow the intruder to move about without generating an alarm. Because an occupant may be able to call 911 or use a panic button of the security system to generate an alarm, such intruders are likely to use violence to subdue any occupants remaining within the premises. While an alarm may later be generated after the intruder leaves the premises, this is often a minor concern to the intruder and the alarm is simply too late. When a user enters a regular system, there is an entry delay, where the user punches his or her code or else an alarm will be generated when the delay expires. When the code is entered, the system is fully disarmed. At this moment, and until the system is re-armed into the stay mode all premises are unprotected. This involves a two-step process, namely the entering of a code to disarm the system, and then subsequently a code to re-arm the system. This delay to enter two subsequent codes can be sufficient time for an intruder to take advantage of the full disarming of the system. An intruder that learns occupant habits can wait till someone leave or enter the premises, and during the entry/exit operation can enter the premises via any zone.

SUMMARY OF THE INVENTION

According to a first aspect of the present invention, there is provided a security system that allows users to enter and/or exit secured premises without compromising the security of the rest of the system.

According to a second aspect of the present invention, there is provided a security system that when armed in an away mode immediately switches to an armed stay mode (without first being temporarily disarmed) when a user enters the premises and enters a code.

According to a third aspect of the present invention, there is provided a security system that includes a keypad for security code entry by users in which code entry specifies the action of the code including arm or disarm and at least one of entry and exit.

According to a fourth aspect of the present invention, there is provided a security system in which a satellite keypad is used for code entry near a point of protected premises entry or exit to enter an entry or exit code.

According to a fifth aspect of the present invention, there is provided a security system that is to be used by at least some users at all times in the stay mode and such users only have codes to allow for entry and exit while other users have codes for arming and disarming the security system in addition to entry and exit.

According to a sixth aspect of the present invention, there is provided a security system having more than one stay mode configuration with the ability to select a desired one of the stay mode configurations. Such configurations may be organized as a function of different levels of security, and optionally with the level of security being displayed at a user interface. One example of such different configurations is a nighttime stay mode in which sleeping quarter zones are not armed, while daytime quarter zones are armed, and a daytime stay mode in which all interior zones are not armed. In general, stay mode configurations are determined by occupant usage of the premises, namely unused quarters are armed and used quarters are unarmed, while the interior-exterior perimeter remains armed. A sliding glass door leading onto a closed deck may be unarmed in a stay mode when outdoor areas are considered within protected premises. Other doors and windows may be armed.

In the case that the user interface (e.g. keypad) is located within an armed interior zone, a satellite keypad within the unarmed area may be used to switch between stay mode configurations before an occupant enters an interior armed zone, or pass authentication may be done immediately following entry into the armed interior zone.

According to a seventh aspect of the present invention, there is provided a security system in which detector zones are classified as "with entry and/or exit delay" or as "immediate alarm", the latter class either requiring a user to provide a specific disarm authentication or immediately generating an alarm without allowing for the user to stop the alarm generation. The specific disarm authentication may optionally be available to a reduced number of users or occupants, while authentication for entry or exit via zones specifically identified for this purpose is made available for all authorized users or occupants. To avoid false alarms, it may be desirable to combine physical security, such as key locks or deadbolts, to prevent occupants or users (particularly those users or occupants not authorized to provide the specific disarm authentication) from inadvertently using doors classified as "immediate alarm".

Optionally, the security system may be programmed with different classification configurations of the zones with the ability to select a desired one of the classification configurations. The classification configuration may be combined with the stay mode configuration, in accordance with the sixth aspect of the present invention. This also allows for the option of organizing configurations according to security level.

BRIEF DESCRIPTION OF THE DRAWINGS

The invention will be better understood by way of the following detailed description with reference to the appended drawings, which.

DETAILED DESCRIPTION OF THE INVENTION

Figure 1:
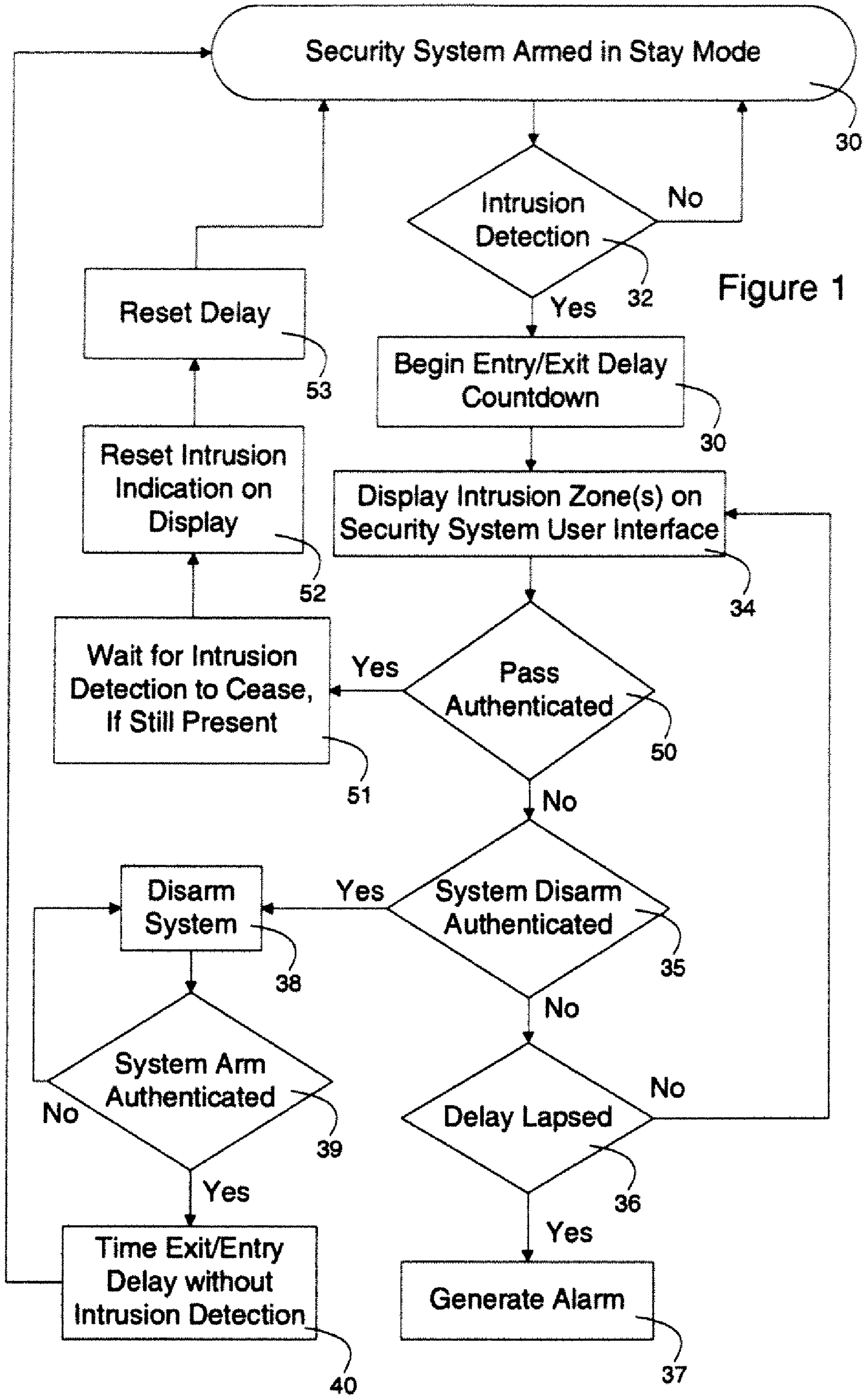
FIG. 1 is a flow chart illustrating the sequence of operational steps of a security system in a stay mode according to one embodiment of the invention.

With reference to FIG. 1, the operation of a security system is schematically summarized in which steps 30 through 40 are found in conventional systems, while steps 50 and up are new. A security system is armed in the single "stay mode" at step 30, and as long as no intrusion is detected (step 32) among the stay mode active sensors and detectors no action is taken.

In accordance with one embodiment of the invention, the arming in the stay mode involves selecting one of a number of stay modes with different levels of security. These different stay modes may correspond to different partitions of the secured premises in addition to different levels of security. Once intrusion is detected, an exit or entry delay countdown is started at step 33. This is followed by indicating the zone of the intrusion on the security system user interface at step 34.

Optionally according to some embodiments of the invention, zones may be classified "entry/exit delay" and "immediate". If the intrusion detected in step 32 is in a zone that is "immediate", the system may immediate jump to step 37 or it may operate with delay without offering the option of normal pass authentication. This may be done by following conventional operation requiring the user to enter a system disarm code (step 35) that in accordance with the present invention may not be available to all users or occupants, or by following the embodiment of FIG. 1 with step 50, but with a special authentication. If the zone is classified as "entry/exit delay", then the process is as per FIG. 1.

In the conventional mode of operation, only two options are available to the user: do nothing, and the security system will proceed to generate an alarm once the delay has lapsed (steps 36 and 37); and disarm the system before the delay lapses (steps 35 and 38). Once the system is disarmed at step 38, the user is required to rearm the system at step 39 in order to be reprotected. However, the security system applies the normal exit delay at step 40 before beginning the normal stay mode armed state at 30.

In the embodiment of FIG. 1, the user has an additional option of authenticating a pass (step 50), namely to authorize the entry or exit from the secured premises, before the delay lapses. Authenticating a pass at step 50 may involve entering a special code at a keypad or any equivalent means of authenticating an occupant of the secured premises. When using pass authentication, the security system remains armed and active for all other zones. For the zone that was used for the entry or exit, the system will make sure that the intrusion detection ceases at step 51, for example the door sensor detects that the door is closed following entry or exit. Then the display of the zone on the security system interface as being subject to intrusion is reset at step 52, and the Entry/Exit Delay is reset at step 53. The security system then returns to the normal armed stay mode at step 30.

Figure 2:
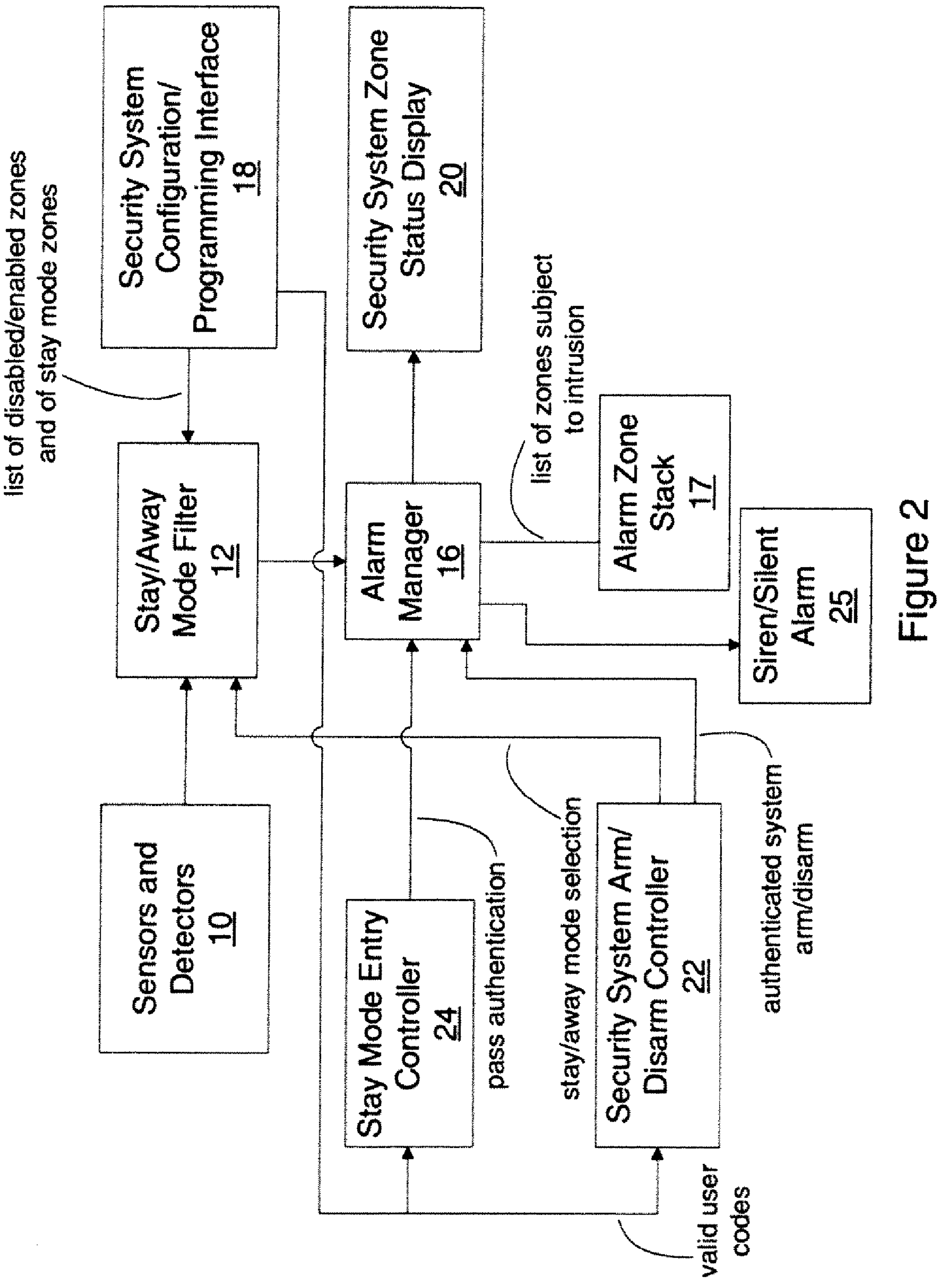
FIG. 2 is a schematic block diagram of a security system having a stay mode entry controller generating a pass signal for canceling an intrusion event.
Figure 3:
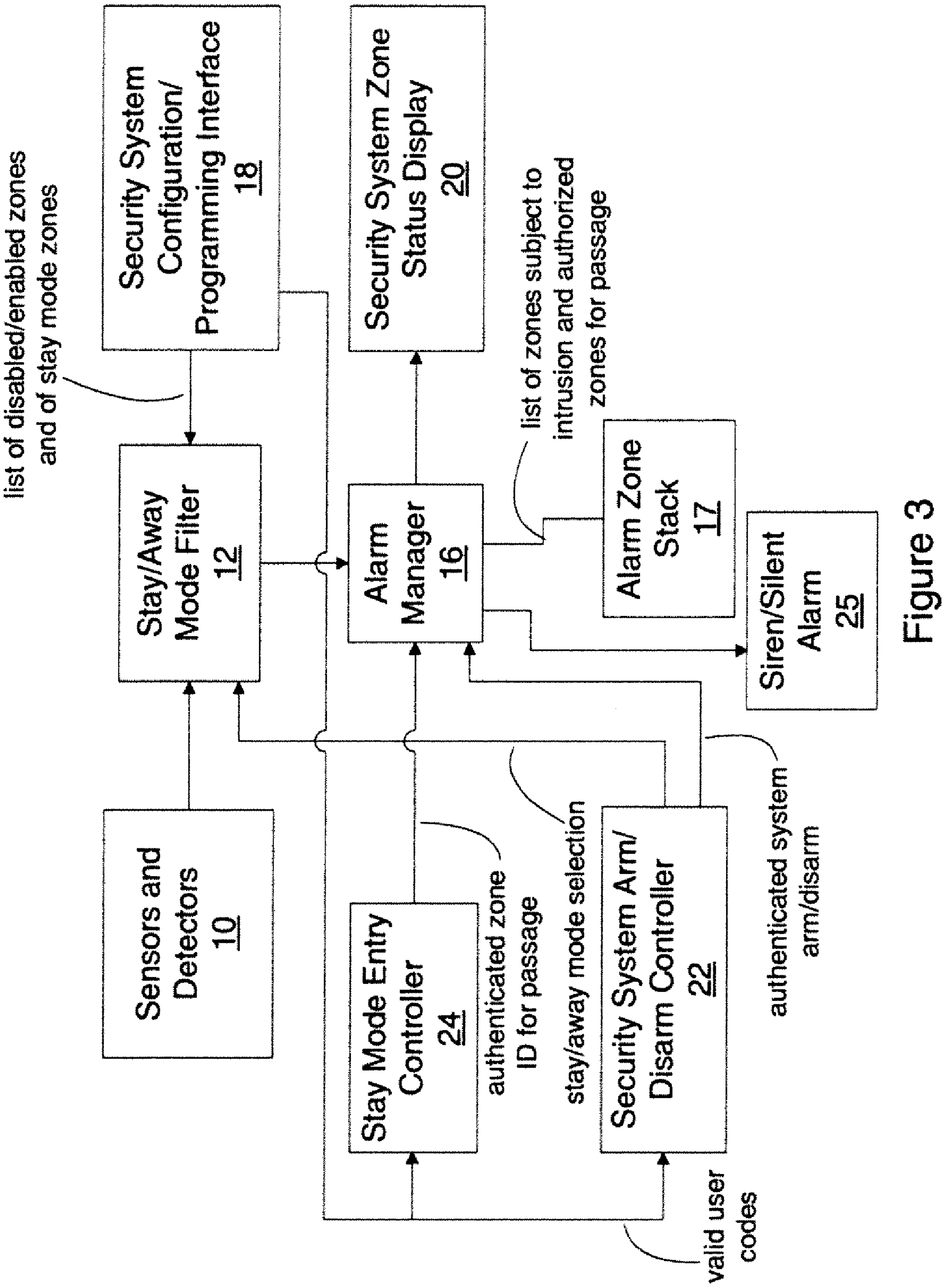
FIG. 3 is a schematic block diagram of a security system having a stay mode entry controller generating a zone specific pass signal for canceling an intrusion event for a specific zone.
Figure 4:
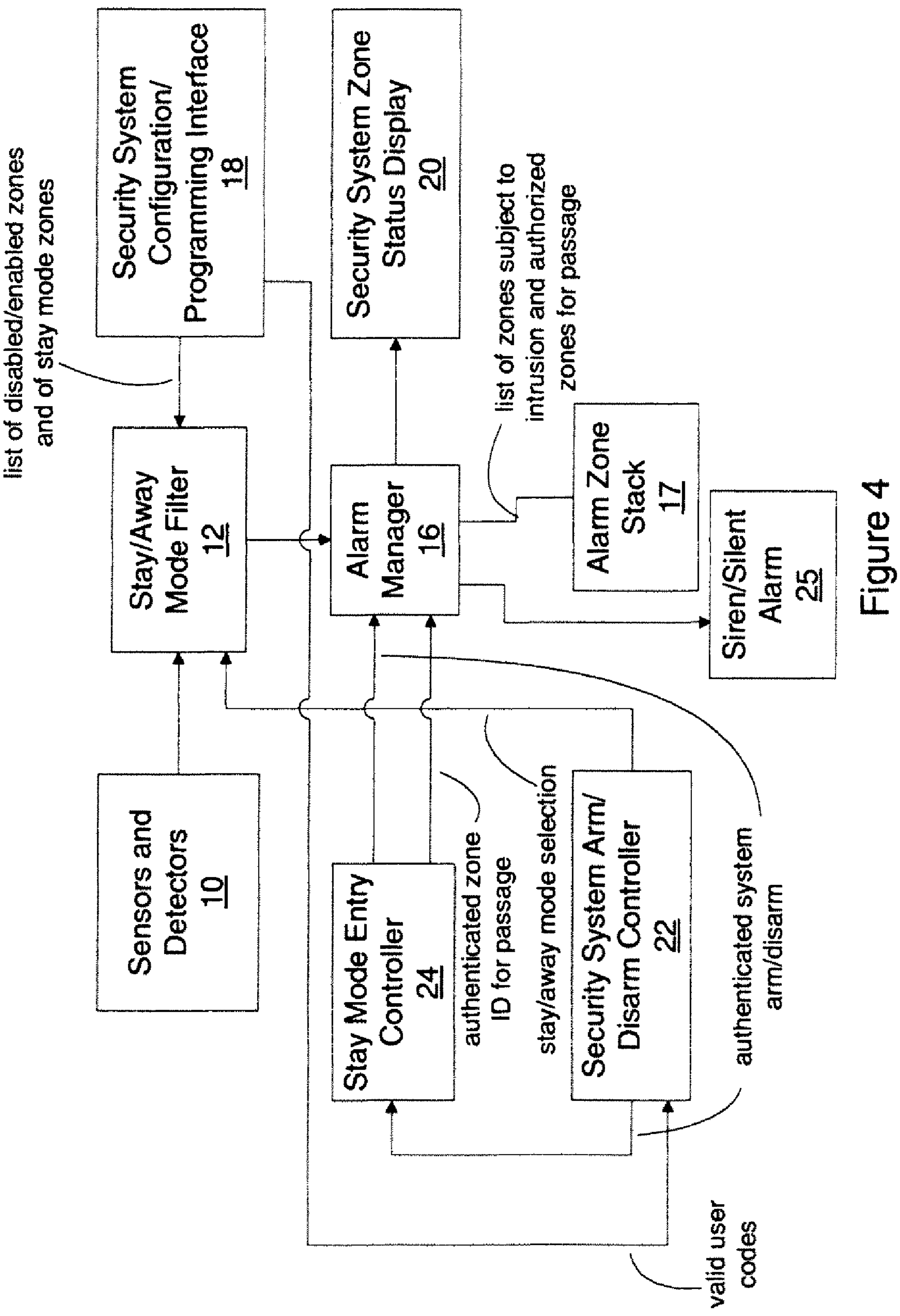
FIG. 4 is a schematic block diagram of a security system having a stay mode entry controller cooperating with an arm/disarm authentication controller to generate a pass signal for canceling an intrusion event.

FIGS. 2 to 4 schematically illustrate a security system according to a first embodiment. Such schematic illustration is for the purposes of understanding the invention, without necessarily following an actual implementation that may involve dedicated logic circuitry, programmed circuitry, a programmed microcontroller, a programmed computer, or any combination thereof.

In FIGS. 2, 3 and 4, security sensors and detectors 10 of the secured premises are connected by secure connection (wired, optical or wireless) to an alarm manager 16 through a stay/away mode filter 12. Filter 12 is configured using a programming interface 18 to indicate to filter 12 the list of enabled and disabled zones as well as the stay mode zones. Zones can be identified typically as being immediate alarm or with a timer or countdown before generating an alarm, active or enabled, disabled or by-passed, in a follow mode where the zone is by-passed as a function of detection by another zone and otherwise active. Follow mode is used for zones next to doors, for example. In this way, the manager 16 only considers intrusion events coming from enabled armed zones in the selected mode of away or stay. When an intrusion event occurs, manager 16 causes the status display 20 to show the event. Programming interface 18 uses a keypad and display to first authenticate a master user and allow such master user to configure the system including defining the valid user codes. When the alarm manager 16 receives an intrusion signal from a sensor or detector 10 through filter 12, it enters the event in memory 17 that may be arranged as a stack or circular buffer, and begins a timer countdown before an alarm is generated using unit 25.

In some embodiments, the interface 18 may be used to program more than one stay mode configuration. Such configurations may be organized as a function of different levels of security. Display 20 may display the selected level of security. One example of such different configurations is a nighttime stay mode in which sleeping quarter zones are not armed, while daytime quarter zones are armed, and a daytime stay mode in which all interior zones are not armed. In general, stay mode configurations are determined by occupant usage of the premises, namely unused quarters are armed and used quarters are unarmed, while the interior-exterior perimeter remains armed. A sliding glass door leading onto a closed deck may be unarmed in a stay mode when outdoor areas are considered within protected premises. Other doors and windows may be armed.

In the case that the user interface (e.g. keypad) is located within an armed interior zone, a satellite keypad associated with controller 22 and/or controller 24 can be provided within the unarmed area for switching between stay mode configurations before an occupant enters an interior armed zone, or pass authentication may be done immediately following entry into the armed interior zone.

In other embodiments, the programming interface 18 is used to classify zones as "with entry and/or exit delay" or as "immediate alarm", the latter class either requiring a user to provide a specific disarm authentication or immediately generating an alarm without allowing for the user to stop the alarm generation. In this case, the interface 18 communicates this configuration to alarm manager 16, preferably via stay mode filter 12. When the stay mode filter signals to alarm manager 16 that an armed zone has detected intrusion, the alarm manager 16 determines whether the zone is "with delay" or "immediate". If the zone is "with delay", then pass authentication may be used as in the embodiment of FIG. 2 or 3. If the zone is classified as "immediate", then the system may be configured either to generate an immediate alarm, namely manager 16 signals alarm 25 immediately, or else, a delay is implemented with alarm generation being avoided either by system disarm or by special pass authentication. The specific disarm authentication is preferably available to a reduced number of users or occupants, while authentication for entry or exit via zones specifically identified for this purpose is made available for all authorized users or occupants.

It will be appreciated that the programming interface 18 can be used in some embodiments to define in each stay mode configuration which zones may be used by which users for entry and/or exit.

Separate lists may handle entry and exit, since it may be acceptable for a user to authenticate an exit through a door, while the same door would not be secure for entry. For example, it may be acceptable to authenticate a user from within the premises to exit through a door leading into a back alley, while no user should be allowed to enter through such back alley due to a higher risk of an intruder entering with the user by force.

Likewise, some users may be authorized to enter or to exit via certain zones, while others are not. Pass authentication can identify individual users or a level of user (group of users) so that more precise management of entry and exit of users can be provided. Logging of user entry and exit can be done efficiently when authentication is unique to each user. In the case that some users, such as employees or children, are not authorized to arm or disarm the system, but instead merely to use pass authorization, then greater security can be provided.

To avoid false alarms, physical security, such as key locks or deadbolts, is combined with the electronic security system to prevent occupants or users (particularly those users or occupants not authorized to provide the specific disarm authentication) from inadvertently using doors classified as "immediate alarm".

Optionally, the security system may be programmed with different classification configurations of the zones with the ability to select a desired one of the classification configurations. The classification configuration may be combined with the stay mode configuration and communicated to alarm manager 16 via the stay mode filter 12. This also allows for the option of organizing configurations according to security level that can be displayed on display 20.

In FIG. 2, an arm/disarm controller 22 is included for authenticating a user and then either arming the security system or disarming the security system by signaling the alarm manager 16 accordingly. A stay mode entry controller 24 is also provided for authenticating a user and issuing a pass. The valid user codes used by the two controllers 22 and 24 may be the same or different, and may be user specific or not. The alarm manager 16 responds to the pass signal by removing or otherwise ignoring one intrusion event in memory 17. If only one event was recorded, a single pass will cause the alarm manager to continue to operate in the armed stay mode, and the display 20 will indicate no intrusion events. If two or more events were recorded, a single pass will cause the alarm manager merely to remove or ignore the first received event, and the display will show the remaining events (namely the zones where intrusion was detected). The user would need to use the stay mode entry controller 24 repeatedly to generate additional pass signals to remove all events to prevent an alarm from being generated. However, in conventional configurations, two events generated during exit or entry would be an indication of foul play.

In FIG. 3, the operation is similar to FIG. 2 except that the controller 24 generates a pass signal that identifies the zone through which the pass is to be authorized, and manager 16 removes or ignores the event corresponding to the identified zone only. This allows for a clear identification on display 20 of the exact zones where an unauthorized event was detected after the user authenticates the zone specific pass.

Zone identification in the pass signal can be done by using a keypad that is related to the specific entry/exit zone. A satellite keypad can be located near an entrance/exit for this purpose. Such a co-located keypad can be set to identify the local entrance/exit by default, while still be used with an additional key press for authenticating an exit or entry via a different door.

As an alternative to the embodiment of FIG. 2, the stay mode controller 24 functionality, as shown in FIG. 4, may be provided by cooperating with controller 22 for the purposes of authenticating the user, while for example allowing the user to press a key on a keypad to issue a pass authentication instead of a disarm or arm signal command. As an example, the user may enter the secured premises, thus creating an intrusion event. At the user interface keypad, the user enters the normal code for disarming the system. The controller 22 however sends this signal to controller 24 for processing. Controller 24 causes an indicator on the interface keypad to flash or otherwise to indicate that the system will disarm very shortly, say in 3 seconds. If the user presses a key on the keypad, possibly associated with the flashing indicator, then controller 24 issues to alarm manager 16 a pass authentication signal. If the key is not pressed within the short time period, then controller 24 issues the authenticated disarm signal. For the user, this embodiment allows for a single code to be used and for a simply key press to change the authenticated function from full disarm to pass. Use of a single code can be easier for the user, either because only one code for keypad entry needs to be memorized or because only one key or RFID device needs to be in possession of the user.

For issuing a pass for exiting the secured premises, the operation is similar. A user enters at controller 22 the normal disarm code. The controller 24 then causes display 20 to indicate that disarm has been authenticated and will take effect shortly. The user may press a key within the short time period to cause controller 24 to issue to alarm manager 16 a pass authentication instead of a disarm signal. In absence of the user entry within the short period, the controller 24 sends the disarm signal.

As an alternative embodiment to the embodiment of FIG. 3, the key to be pressed can indicate the zone for which the pass is to be issued, and thus will trigger the pass and specify the zone at the same time. Of course, it is likewise possible to require an entry to request a pass instead of a system disarm and a separate entry to request that the pass applies to a specified zone.

It will be appreciated that the use of RFID transponders, smart cards, Dallas® keys, magnetic stripe cards, key lock switches, biometric scanners, or the like may be used in place of a keypad or in conjunction with a keypad for authenticating users or occupants. In the above embodiments, pass authentication is done using a controller 24 within the secured premises. However, it will be appreciated that when a user is authenticated outside secured premises as part of access control, such authentication can be either used in combination with inside authentication for pass authentication purposes, or may be used as a substitute for inside secured premises pass authentication. Such security system configuration can be defined as a function of specific doors and/or as a function of specific users. In the case that different stay mode configurations are provided, access control authentication may be used for pass authentication in some stay mode configurations and not others.

Figure 5A:
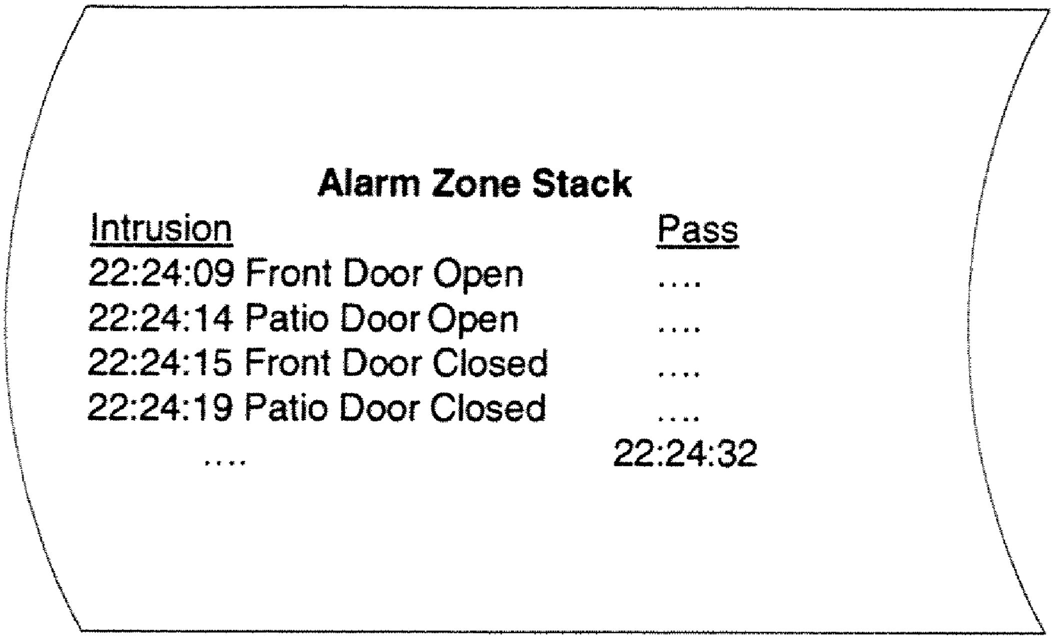
FIG. 5*a* is a schematic representation of the content of an intrusion event stack corresponding to the embodiment of FIG. 2 for two entries into the protected premises with a single authenticated pass.

As illustrated in FIG. 5*a*, if an occupant enters protected premises and a few seconds later a thief enters through a different entrance, the events may be recorded as shown. In the embodiment of FIG. 2, the pass does not identify the event, and so it is assumed that it is the first event to be passed. The display will continue to show the outstanding "patio door" zone event after the pass is authenticated, and the alarm will be generated unless other action is taken.

Figure 5B:
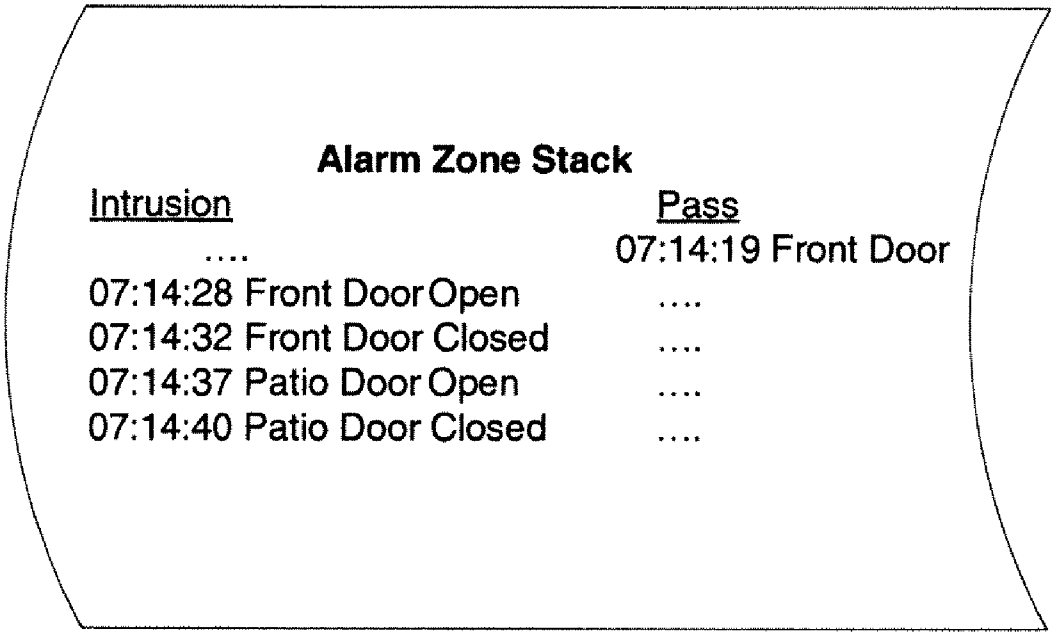
FIG. 5*b* is a schematic representation of the content of an intrusion event stack corresponding to the embodiment of FIG. 3 for one authorized exit and one intrusion entry into the protected premises with a single authenticated zone specific pass.

As illustrated in FIG. 5*b*, if an occupant leaves protected premises and a few seconds later a thief enters through a different entrance, the events may be recorded as shown. In the embodiment of FIG. 3, the pass identifies the event, and so remaining occupants will see on the display the outstanding "patio door" zone event, and the alarm will be generated unless other action is taken.

Figure 5C:
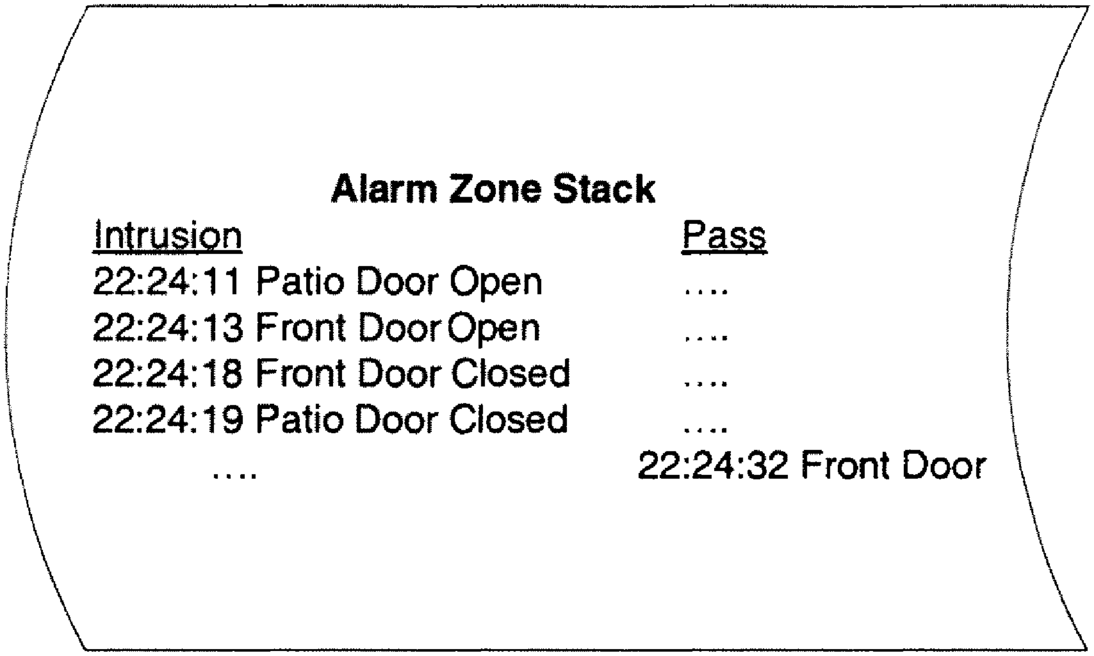
FIG. 5*c* is a schematic representation of the content of an intrusion event stack corresponding to the embodiment of FIG. 3 for two entries into the protected premises with a single authenticated zone specific pass.

As illustrated in FIG. 5*c*, if a thief carefully monitors an occupant entering protected premises, perhaps with the help of a spotter in radio contact with the thief, and the thief enters through a different entrance even a few seconds before the occupant, the events may be recorded as shown. In the embodiment of FIG. 3, the pass identifies the event, and so the occupants will see on the display the outstanding "patio door" zone event, and the alarm will be generated unless other action is taken.

The invention claimed is:

1. A security system operable in a stay mode in which protected premises perimeter sensors or detectors are configurable to be armed, wherein if said security system operates in said stay mode, interior sensors or detectors within the protected premises are disarmed and a delay is provided between detection of breach of said perimeter and generating an alarm, said security system comprising a stay mode entry controller adapted to authenticate a user during said delay without generating said alarm and without disarming said protected premises perimeter sensors or detectors prior to reestablishing of said stay mode.

2. The security system as defined in claim 1, wherein said stay mode entry controller is further adapted to authenticate a user about to exit said perimeter and restore said stay mode following detection of breach of said perimeter by said exit without generating said alarm and without disarming said protected premises perimeter sensors or detectors.

3. The security system as defined in claim 2, wherein said stay mode entry controller authenticates said user by detecting a code entered at a keypad.

4. The security system as defined in claim 3, wherein said security system is adapted to use said keypad for arming and disarming said security system.

5. The security system as defined in claim 4, wherein said security system is further adapted to use said keypad for programming said security system.

6. The security system as defined in claim 3, wherein said code is accepted to authenticate said user and to signal to said stay mode entry controller to restore said stay mode without generating said alarm and without disarming said protected premises perimeter sensors or detectors.

7. The security system as defined in claim 6, wherein said code identifies a point of entry through said perimeter, said security system being adapted to generate said alarm if a different point of entry is also detected within said delay.

8. The security system as defined in claim 1, wherein said armed protected premises perimeter sensors or detectors include sensors or detectors associated with at least one zone within said protected premises perimeter, said stay mode being associated with a partition of said protected premises.

9. The security system as defined in claim 8, wherein more than one stay mode configuration is defined and said stay mode entry controller is adapted to allow one of said stay mode configurations to be user selected.

10. The security system as defined in claim 9, wherein said stay mode configurations represent different levels of security.

11. The security system as defined in claim 10, further comprising a display of said selected level of security.

12. The security system as defined in claim 1, wherein said security system is adapted to operate selectively in said stay mode or in an away mode, said security system operating in said away mode with both said protected premises perimeter sensors or detectors and interior sensors or detectors armed wherein another delay is provided between detection of breach of said perimeter or intruder detection within said protected premises and generating an alarm, and said stay mode entry controller is further adapted to authenticate said user during said another delay and place said security system in said stay mode without generating said alarm and without disarming said protected premises perimeter sensors or detectors.

13. The security system as defined in claim 1, wherein said stay mode entry controller is adapted to define which ones of said protected premises perimeter sensors or detectors may be involved in entry or exit with said stay mode entry controller restoring said stay mode without generating said alarm and without disarming said protected premises perimeter sensors or detectors.

14. The security system as defined in claim 13, wherein said system is adapted to generate an immediate alarm when others of said protected premises perimeter sensors or detectors are involved in entry or exit.

15. The security system as defined in claim 13, wherein said system is adapted to generate an alarm when others of said protected premises perimeter sensors or detectors are involved in entry or exit in absence of authentication of said user different from said stay mode controller authentication.

16. The security system as defined in claim 1, wherein said stay mode controller is adapted to have a configuration according to which said stay mode controller authenticates said user as a function of any two of: zone corresponding to said protected premises perimeter sensors or detectors; exit, entry or both; and individual user or one of a plurality of user groups.

17. The security system as defined in claim 16, wherein more than one configuration is defined and said stay mode entry controller is adapted to allow one of said configurations to be user selected.

18. The security system as defined in claim 17, wherein said configurations represent different levels of security.

19. The security system as defined in claim 16, wherein said stay mode controller is adapted to authenticate said user as a function of: zone corresponding to said protected premises perimeter sensors or detectors; exit, entry or both; and individual user or one of a plurality of user groups.

* * * * *